United States Patent Office 3,728,172
Patented Apr. 17, 1973

---

3,728,172
PRODUCT AND PROCESS FOR PRODUCING A CONTAINER CURED ILLUMINANT COMPOSITION
David R. Dillehay, Herman F. Krackenberger, and Howard C. Havron, Marshall, Tex., assignors to Thiokol Chemical Corporation, Bristol, Pa.
No Drawing. Filed Dec. 15, 1970, Ser. No. 98,481
Int. Cl. C06d 1/10
U.S. Cl. 149—19                            28 Claims

ABSTRACT OF THE DISCLOSURE

Illuminant fuels and oxidizers are added to crushable capsules containing curable, illuminant binders and to crushable capsules containing curing agents for the illuminant binders to form a homogeneously mixed, flowable powder, illuminant composition. This composition is dispensed into illuminant containers where a capsule rupturing pressure is applied rupturing the capsules in the composition. This results in the liquid binders and liquid curing agents being released and dispersed throughout the composition and interacting and forming a container cured illuminant.

BACKGROUND OF THE INVENTION

Field of the invention

This invention relates to a product and process for making a container cured illuminant. Particularly, the invention relates to the preparation of an illuminant composition containing illuminant fuels and oxidizers mixed with crushable capsules of binders and crushable capsules of curing agents to form a flowable powder composition which is dispersed into containers and pressed to form a container cured illuminant.

Description of the prior art

Illuminants presently are manufactured by the batch process where the desired amounts of illuminant fuels, oxidizers, liquid binders, liquid curing agents and fillers are mixed together in bulk quantities. This composition is then dispensed by small increments into illuminant containers and pressed to form the finished product.

The above batch process has not been an entirely satisfactory method of preparing illuminants. One of the serious problems is that batch mixing exposes personnel to bulk quantities of hazardous material at the mixer, during transfer and at the press. This process also necessitates a remote facility for manufacturing the illuminant to further insure safety.

Other undesirable aspects of the batch mixing process are the variations in the physical properties of illuminants made by this process. If the curing times of the illuminant compositions are varied, burning rates and candlepowers of the illuminants will also vary. This problem is magnified by the fact that the illuminant compositions have a short "pot life" requiring very precise mixing times, dispensing times and pressing pressures or the physical properties of the illuminant will greatly vary from batch to batch. The dispensing times will by necessity vary somewhat between containers since all the containers are not filled at one time. Therefore, the containers filled at the beginning of the operation are filled with illuminant which is not "pot cured" as long as the containers are filled later in the operation. This results in variations in container filling resulting in many overfills, and variations in burn rate and candlepower between containers of the same batch.

BRIEF SUMMARY OF THE INVENTION

The object of the present invention is directed to providing an improved product and process for producing a container cured illuminant.

The objects of the invention may be accomplished by use of crushable capsules of both binders and curing agents in illuminant compositions. Each material in the composition including the illuminant fuels, oxidizers, and fillers may be separately fed into a system for combining the materials in single container dispensing amounts and then this small amount of material is dispensed into a single container where a capsule crushing amount of pressure is applied resulting in releasing the binders and curing agents into the surrounding materials where they interact, forming a container cured illuminant.

The use of this process provides for each container of illuminant to be uniformly cured and pressed in the container under uniform conditions. This process eliminates variations in burning rates and candlepower between different batches of illuminates and also between containers filled from the same batch of material. Furthermore, this process eliminates the hazard of pre-mixing bulk quantities of the illuminant composition before dispensing into the containers. Since only one single container mixture will exist at any one time no serious hazard is presented. Therefore, this process minimizes personnel exposure to the hazardous materials and protects the manufacturing equipment from serious fires.

DESCRIPTION OF THE PREFERRED EMBODIMENTS

The magnesium used in the illuminant composition is preferably in a particulate form of metal fuel. While magnesium is the preferred fuel, it may be desirable in some cases to use other metals used in pyrotechnic devices as metal fuels in place of some of the magnesium, e.g. aluminum, or magnesium-aluminum and zirconium and their hydrides. The metal fuel is preferably used in amounts from about 40 to 60% by weight of the composition.

Sodium nitrate is preferably used as the oxidizer for the magnesium fuel in the illuminant composition. However, in some cases it may be advantageous to use another metal nitrate, e.g., lithium nitrate, taking due precautions in handling the latter because of its greatly hydroscopic nature. When yellow light is not desired, color producing metal nitrates, such as barium or strontium nitrate, may be used advantageously. The metal nitrate is preferably used in at least a stoichiometric amount relative to the metal fuel ingredient of the illuminant composition. The most preferable amounts is from about 30 to 50% based on the total weight of the composition.

The liquid polymeric binder material used in practicing the invention preferably is a mixture of liquid polyester polymer and liquid epoxy resin. All the liquid ingredients including the liquid binders, curing agents and curing accelerators are used in encapsulated form in order to accomplish the objectives of this invention. The encapsulation of these liquids may be by any of several known procedures. One such method is described in U.S. Pat. 3,041,289 and is herein incorporated by reference. Other such suitable encapsulation methods are described in U.S. Pat. 2,969,331 and U.S. Pat. 2,800,458. In these procedures the material to be encapsulated is dispersed or emulsified in a liquid medium containing the wall material. The wall material is then caused to separate out in a viscous form, deposited or wrapped around the material to be encapsulated, and later solidified and hardened. The core materials of the individual capsules are removed by the physical fracture of the capsules. The encapsulated liquid polyester polymer may be a carboxyl-terminated polyester polymer of a saturated aliphatic diol, a dicarboxylic acid free from ethylenic unsaturation, or a polyfunctional compound free from ethylenic unsaturation and containing at least three functional groups selected from the group consisting of polyols, polycarboxylic acids and polycarboxylic acid anhydrides. The polymeric polyester may be liquid at a temperature between about 25° C. and about 50° C., having an acid content between about 0.1 and about 1.5 milliequivalents per gram, an average of between about 2.5 and about 15 carboxylic groups per molecule, an average molecular weight between about 700 to about 10,000 and free from hydroxyl groups. Such polymers are known and are taught, for example, in U.S. Pat. 3,182,041, incorporated herein by reference. Preferred liquid polyester polymers are those having a high oxygen content combined with the carbon and hydrogen content of the polymer. Especially preferred are liquid polyester polymers having a carbon to hydrogen to oxygen ratio of about 2 to 2.55 to 1 and a viscosity at 25° C. of 480 to 520 poise. Polyesters prepared from saturated diacids, e.g. saturated fatty acids, such as succinic and glutaric acids and their anhydrides are especially preferred. Also capsules which are especially preferred contain polyester resins represented by the formula

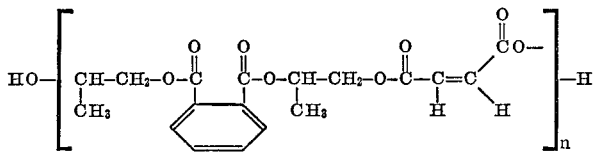

where $n$ is greater than zero. This polyester resin is sold under the trademark Aropol 72–4–MC. The capsule containing this resin contains in addition about 10 to 50% monomeric styrene based on the total weight of the polyester resin, preferably about 25 to 35%; about 4 to 6% rutile filler, preferably 5% titanium dioxide; and 4 to 6% cure accelerator, preferably 5% N,N-dimethyl-p-toluidine, based on the total weight of the unsaturated polyester resin. The crushable capsules containing the above materials are sold under the trademark PEF–512 by National Cash Register Corporation. The preferable amount of these capsules is from about 2 to 8% based on the total weight of the composition.

The binder material is accelerated in its curing by the addition of a small amount of catalyst for the curing agent. Preferably, the curing rate catalyst is N,N'-dimethyl-p-toluidine. The amounts of catalyst used then controls the rate at which the cure occurs.

Generally, it is desirable that the amount of curing agent used be present in at least stoichiometric amount relative to the polyester polymer in order to provide complete cure of the polyester polymer. Polyester resin curing agents, such as polyfunctional aziridines, e.g. trifunctional derivatives of ethylenimine and other alkylenimine derivatives as taught in U.S. Pat. 3,182,041, may be used. Those curing agents preferred are benzoyl peroxide and methyl ethyl ketone peroxide. Especially preferred is benzoyl peroxide.

Liquid epoxy resins and solutions herein are well known, and are also used in capsule form as liquid carriers for the curing agents to accomplish the objects of this invention. The epoxy resins are formed by the reaction of a 1,2-epoxy compound and a dihydric phenol. The preferred 1,2-epoxy resins are prepared by the reaction of epichlohydrin with bisphenol-A (2,2-bis(4-hydroxyphenyl)-propane), generally in alkaline solution, such compounds including, for example, polyglycidyl ethers of ethylene glycol, propylene glycol, trimethylene glycol, diethylene glycol, triethylene glycol, glycerol, dipropylene glycol, etc. Similarly, other dihydric phenols may be employed, including resorcinol, catechol, hydroquinone, 4,4'-dihydroxybenzophenone, 1,1 - bis-(4-hydroxyphenyl)-butane, 1,5-dihydroxynaphthylene, etc. It is understood that the epoxy resins formed from the various reactants mentioned above are not necessarily equivalent and, furthermore, that the exact composition of the epoxy resins are dependent upon the molecular proportions of the epoxy compound and dihydric phenol employed in its preparation. Preferred liquid epoxy resins are those having an epoxide equivalent (weight of resin in grams containing 1 gram of epoxy resin) of about 175 to 210 and a viscosity of about 500 to 900 centipoises. When a solvent is used, organic solvent such as toluene, xylene and ketones, e.g. acetone, are preferably used. The liquid epoxy resin normally serves as a curing agent carrier for the polyester polymer. While the liquid epoxy resins do not necessarily cure with the polyester polymers, these resins may be cured by the addition of epoxy resins curing agents, e.g. anhydrides or dianhydrides. The curing of these epoxy resins give added strength to the cured illuminant.

Capsules which are preferred contain a liquid carrier for the curing agent. A liquid carrier especially preferred is diglycidyl ether of bisphenol A resin represented by the formula

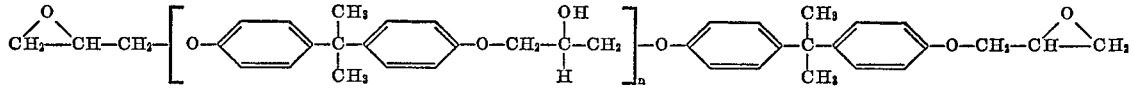

where $n$ is greater than zero. This material is sold under the trademark Epon 828. The capsule containing the above resin contains in addition about 10 to 14% curing agent preferably 12% benzoyl peroxide based on the total weight of the resinous liquid carrier. The crushable capsules containing the above material are sold under the trademark PEF–512 by National Cash Register Corporation. The preferable amount of these capsules is from about 1 to 5% based on the total weight of the composition.

The preferred ratio of the capsules containing the curable binder, fillers and cure accelerators to the capsules containing the curing agent and liquid carrier is 2:1.

By using an on-line blender or mixer, small container size mixes may be made, eliminating the necessity of mixing large amounts of the illuminant fuels and oxidizers at one time.

The container size of mixed powdered illuminant is dispensed into an illuminant container where a capsule rupturing and consolidating amount of pressure is applied to form the illuminant. The capsule rupturing and consolidating pressure may be from about 2,000 p.s.i. to 10,000 p.s.i., preferably 5,000 p.s.i. to 7,000 p.s.i.

There are many automatic powder loading and consolidating machines available which may be used. Such machines are described in U.S. Pat. 2,300,250, U.S. Pat. 2,834,383 and U.S. Pat. 2,901,209.

While specific ingredients have been used to describe and illustrate the invention, it is to be understood that other ingredients having equivalent properties may be substituted for those shown in order to practice the invention and to obtain the benefits and advantages thereof.

The following non-limiting examples are submitted to further illustrate the invention.

The invention is illustrated by means of a representative, commercially available capsular adhesive made up of two types of capsules. One capsule contains a diglycidyl ether of bisphenol A resin represented by the formula

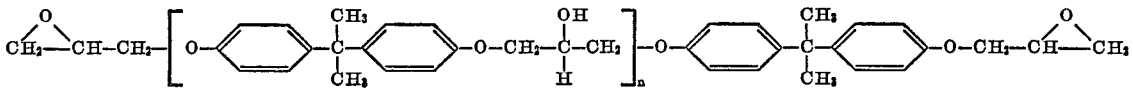

where n is greater than zero and, in addition, the capsule contains 12% benzoyl peroxide, curing agent, based on the total weight of the diglycidyl ether of bisphenol A resin. The other capsule contains an unsaturated polyester resin curable binder prepared by fusing a mixture of phthalic anhydride, maleic anhydride and propylene glycol forming a compound represented by the formula

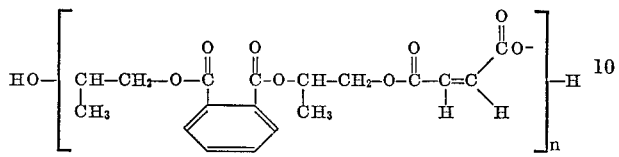

where n is greater than zero and, in addition, the capsule contains about 25 to 35% monomeric styrene based on the total weight of the polyester resin, 5% titanium dioxide, as a filler, and 5% N,N'-dimethyl-p-toluidine, as a cure accelerator, based on the total weight of the unsaturated polyester resin.

Both capsules are sold under the trademark PEF-512 by National Cash Register Corporation.

The containers for this illuminant may be made from any material normally used for illuminant containers. Materials preferred are cardboard or metal.

In the illuminant composition the ingredients including the illuminant fuel, oxidizer, encapsulated binder, encapsulated curing agent, cure accelerators and fillers were merely mixed to form a homogenized powdered mixture.

These ingredients as illustrated in Examples 1–9 were then dispensed into cardboard canisters approximately 1.2 inches in diameter and 2.5 inches long. After dispensing, a capsule rupturing and consolidating pressure of about 5,000 p.s.i. was applied by use of a powder consolidating press.

In order to illustrate the performance of the compositions of Examples 1–9, Table II illustrates the burning time, candle power and light integral of these illuminant compositions. Normally the performance should be about 25 seconds burn time, minimum, 125,000 candlepower and 45,000 light integral.

To further illustrate the performance of the compositions of Examples 1–9, illuminant pellets approximately 1 inch in diameter and 0.75 inch long were made from these compositions by use of a standard die and press. The consolidated pressure was approximately 6,000 p.s.i. The uncased pellets of illuminant were placed in a Riehle tester and the amount of force necessary to crush these pellets were measured in pounds per square inch (p.s.i). Table I illustrates the amount of pounds per square inch necessary to crush these uncased pellets. Normally, 2,000 p.s.i. minimum is considered to be desirable to insure good performance of the illuminant.

| Example Number | Parts by weight (p.b.w.) of— | | | | | | | | |
| --- | --- | --- | --- | --- | --- | --- | --- | --- | --- |
|  | 1 | 2 | 3 | 4 | 5 | 6 | 7 | 8 | 9 |
| Crushable capsules containing diglycidyl ether of bisphenol A resin (Epon 828) and 12% benzoyl peroxide, curing agent, based on the total weight of the resin. (National Cash Register Corporation PEF 512) | 2 | 2 | 2 | 3 | 3 | 3 | 4 | 4 | 4 |
| Crushable capsules containing unsaturated polyester resin (Aropal 72-40-MC), 5% titanium dioxide (filler) and 5% N,N-dimethyl-p-toluidine, cure accelerator based on the total weight of the resin. (National Cash Register Corporation PEF 512) | 4 | 4 | 4 | 5 | 5 | 5 | 6 | 6 | 6 |
| Magnesium granules (chipped and balled, 50 to 200 mesh) | 45 | 50 | 55 | 45 | 50 | 55 | 45 | 50 | 55 |
| Sodium nitrate (crystalline, prilled and ground) | 49 | 44 | 39 | 47 | 42 | 37 | 45 | 40 | 35 |

TABLE I

| Example Number | Pellet crush strength, p.s.i. | | |
| --- | --- | --- | --- |
|  | −65° F. | +70° F. | +160° F. |
| 1 | 4,607 | 3,673 | 3,226 |
| 2 | 3,843 | 3,472 | 3,802 |
| 3 | 3,886 | 3,547 | 3,175 |
| 4 | 3,815 | 4,031 | 5,180 |
| 5 | 3,845 | 3,711 | 4,125 |
| 6 | 3,636 | 3,306 | 3,509 |
| 7 | 3,440 | 3,463 | 4,764 |
| 8 | 2,928 | 3,094 | 4,209 |
| 9 | 3,695 | 3,364 | 3,950 |

TABLE II

| Example Number | Burn time, seconds | Candle-power | Light (c.p.-sec./gm.) integral |
| --- | --- | --- | --- |
| 1 | 31 | 140,000 | 57,500 |
| 2 | 21 | 200,000 | 56,000 |
| 3 | | | |
| 4 | 30 | 130,000 | 52,000 |
| 5 | 23 | 170,000 | 52,200 |
| 6 | 21 | 185,000 | 51,800 |
| 7 | 30 | 120,000 | 48,000 |
| 8 | 23 | 130,000 | 48,500 |
| 9 | 26 | 140,000 | 48,500 |

What is claimed is:

1. An improved illuminant composition in free flowing particulate form comprising an illuminant fuel, oxidizer, a multiplicity of crushable capsules containing a curable binder for said composition and a multiplicity of crushable capsules containing a curing agent for said binder.

2. The illuminant composition of claim 1 wherein the ratio of curable binder capsules to curing agent capsules is 2:1.

3. An improved illuminant composition in free flowing particulate form comprising an illuminant fuel and oxidizer, a multiplicity of crushable capsules containing an unsaturated polyester resin curable binder, about 10 to 40% monomeric styrene, about 4 to 6% rutile filler, and about 4 to 6% cure accelerator based on the total weight of the unsaturated polyester resin; and a multiplicity of crushable capsules containing a resinous liquid carrier and 10 to 14% curing agent for said binder based on the total weight of the resinous liquid carrier.

4. The composition of claim 3 wherein the illuminant fuel is selected from the group consisting of magnesium, aluminum and zirconium.

5. The composition of claim 4 wherein the illuminant fuel is magnesium.

6. The composition of claim 3 wherein the oxidizer is selected from the group consisting of sodium nitrate, lithium nitrate, barium nitrate and strontium nitrate.

7. The composition of claim 6 wherein the oxidizer is sodium nirtate.

8. The composition as in claim 3 wherein the unsaturated polyester resin curable binder is represented by the formula

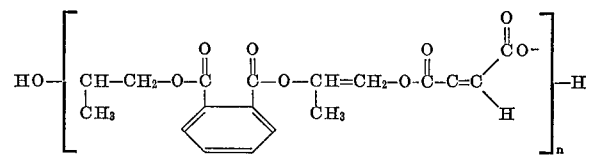

where n is greater than zero.

9. The composition as in claim 3 wherein the styrene is present in about 25 to 35% by weight based on the total weight of the polyester resin.

10. The composition as in claim 3 wherein the rutile filler is titanium dioxide.

11. The composition as in claim 3 wherein the cure accelerator is N,N'-dimethyl-p-toluidine.

12. The composition as in claim 3 wherein the resinous liquid carrier is a diglycidyl ether of bisphenol A resin represented by the formula

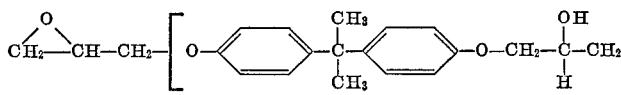

where *n* is greater than zero.

13. The composition of claim 3 wherein the curing agent is benzoyl peroxide.

14. A process for producing a container-cured illuminant comprising admixing illuminant fuel particles, oxidizer particles, a multiplicity of crushable capsules containing a curable binder for the particles and a multiplicity of crushable capsules containing a curing agent for said binder; dispensing the admixture into a container; and applying a capsule rupturing pressure to the admixture, rupturing the capsules and releasing and interacting the binder and curing agent within the admixture in the container, thereby forming the container-cured illuminant.

15. A process for producing a container-cured illuminant comprising admixing from about 40 to 60% illuminant fuel particles based on the total weight of the composition, 30 to 50% oxidizer particles based on the total weight of the composition, 2 to 8% crushable capsules based on the total weight of the composition containing an unsaturated polyester resin, 10 to 50% monomeric styrene, 4 to 6% rutile filler, and 4 to 6% cure accelerator, based on the weight of the polyester resin; and 1 to 5% crushable capsules based on the total weight of the composition containing a resinous liquid carrier, and 10–14% curing agent based on the weight of the resinous liquid carrier; dispensing the admixture into a container;

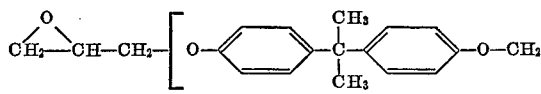

and applying a capsule rupturing and consolidating pressure to the admixture, rupturing the capsules and releasing and interacting the binder and curing agent within the admixture in the container, thereby forming the container-cured illuminant.

16. The process as in claim 15 wherein the ratio of curable binder capsules containing the polyester resin, the rutile filler and the cure accelerator to curing agent capsules containing the resinous liquid carrier and curing agent is 2:1.

17. The process as in claim 16 wherein the capsules rupturing pressure is about 5,000 p.s.i. to 7,000 p.s.i.

18. A container-cured illuminant produced by the process of claim 17.

19. The process as in claim 15 wherein the illuminant fuel is selected from the group consisting of magnesium, aluminum and zirconium.

20. The process as in claim 19 wherein the illuminant fuel is magnesium.

21. The process as in claim 15 wherein the oxidizer is selected form the group consisting of sodium nitrate, lithium nitrate, barium nitrate and strontium nitrate.

22. The process as in claim 21 wherein the oxidizer is sodium nitrate.

23. The process as in claim 15 wherein the unsaturated polyester resin curable binder is represented by the formula

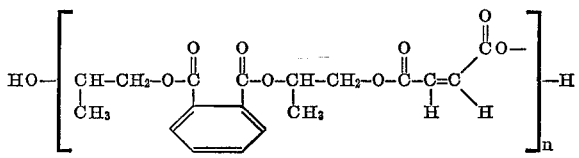

where *n* is greater than zero.

24. The process as in claim 15 wherein the amount of monomeric styrene is about 25 to 35% by weight based on the weight of the polyester resin.

25. The process as in claim 15 wherein the rutile filler is titanium dioxide.

26. The process as in claim 15 wherein the cure accelerator is N,N'-dimethyl-p-toluidine.

27. The process as in claim 15 wherein the resinous liquid carrier is a diglycidyl ether of bisphenol A resin represented by the formula

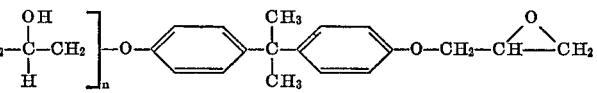

where *n* is greater than zero.

28. The process of claim 15 wherein the curing agent is benzoyl peroxide.

References Cited
UNITED STATES PATENTS

| | | | |
|---|---|---|---|
| 3,049,454 | 8/1962 | Stark | 149—2 |
| 3,101,288 | 8/1963 | Courser et al. | 149—21 |
| 3,162,559 | 12/1964 | Thomas et al. | 149—19 |
| 3,203,842 | 8/1965 | Godfrey | 149—19 |
| 3,411,963 | 11/1968 | Douda | 149—19 |
| 3,454,436 | 7/1969 | Bedell | 149—19 |

CARL D. QUARFORTH, Primary Examiner

E. A. MILLER, Assistant Examiner

U.S. Cl. X.R.

149—2, 21, 44, 61; 264—3 R